United States Patent [19]

Giacopelli et al.

[11] Patent Number: 4,866,701
[45] Date of Patent: Sep. 12, 1989

[54] PACKET SWITCH WITH DYNAMIC ALLOCATION OF INPUTS

[75] Inventors: James N. Giacopelli, Flanders; Walter D. Sincoskie, Bethlehem Township, Hunterdon County, both of N.J.

[73] Assignee: Bell Communications Research, Inc., Livingston, N.J.

[21] Appl. No.: 240,745

[22] Filed: Sep. 2, 1988

[51] Int. Cl.[4] .............................................. H04J 3/26
[52] U.S. Cl. ........................................ 370/60; 370/65
[58] Field of Search ..................... 370/54, 60, 94, 55, 370/58, 65

[56] References Cited

PUBLICATIONS

"A Broadband Packet Switch for Integrated Transport", by J. Y. Hui et al., IEEE Journal on Selected Areas in Communications, vol. SAC-5, No. 8, pp. 1264–1273, Oct., 1987.
"Reservation–Based Contention Resolution Mechanism for Batcher-Banyan Packet Switches", by B. Bingham et al., Electronics Letters, vol. 24, No. 13, Jun. 23, 1988.
"The Knockout Switch: A. Simple, Modular Architecture for High-Performance Packet Switching", by Y. S. Yeh et al., Proc. ISS '87, pp. 801–808, Mar. 1987.
"Starlite: A Wideband Digital Switch", A. Huang et al., Proc. Globecom '84, pp. 121–125, Nov. 1984.
"Applications of Self-Routing Switches to LATA Fiber Optic Networks", by C. Day et al., Proc. ISS '87, pp. 519–523, Mar. 1987.
"Design of an Integrated Services Packet Network", by J. Turner, IEEE JSAC, vol. SAC-4, No. 8, pp. 1373–1379, Nov. 1986.
"Asynchronous Time-Division Techniques: An Experimental Packet Network Integrating Videocommunication", by A. Thomas et al., ISS '84, Session 32 C Paper 2, pp. 1–7, May 1984.
"Dynamic TDA-A Packet Approach to Broadband Networking", by L. T. Wu et al., Proc. ICC '87 1585–1592, Jun. 1987.

Primary Examiner—Douglas W. Olms
Assistant Examiner—Melvin Marcelo
Attorney, Agent, or Firm—James W. Falk

[57] ABSTRACT

A novel packet switch architecture is disclosed. In the novel packet switch, inputs are dynamically allocated between newly arriving and recirculating packets to make maximum use of available bandwidth while simultaneously resolving output port conflicts.

12 Claims, 8 Drawing Sheets

FIG. 9

| | | | | | | | |
|---|---|---|---|---|---|---|---|
| DATA PACKET | DATA FIELD | X | PRIORITY FIELD | TRAP FLAG | PKT INDEX | 1 | LOGICAL ADDRESS INDEX |
| CONTROL PACKET | X | X | PHYSICAL ADDRESS | TRAP FLAG | X | 0 | LOGICAL ADDRESS INDEX |

| | | |
|---|---|---|
| LOGICAL ADDRESS | ACTIVITY BIT | |
| LOGICAL ADDRESS | ACTIVITY BIT | |

FIG. 10

| | | | | | | | |
|---|---|---|---|---|---|---|---|
| DATA PACKET (TRAPPED) | DATA FIELD | LOGICAL ADDRESS INDEX | LOGICAL ADDRESS | ACTIVITY BIT | X | PRIORITY FIELD | 0 | PKT INDEX |
| DATA PACKET (PAIRED) | DATA FIELD | LOGICAL ADDRESS INDEX | LOGICAL ADDRESS | ACTIVITY BIT | PRIORITY FIELD | PHYSICAL ADDRESS | 1 | PKT INDEX |
| CONTROL PACKET | X | LOGICAL ADDRESS INDEX | LOGICAL ADDRESS | ACTIVITY BIT | X | PHYSICAL ADDRESS | 1 | X |

| |
|---|
| 1 |
| 1 |
| 0 |

PACKET SWITCH WITH DYNAMIC ALLOCATION OF INPUTS

FIELD OF THE INVENTION

The present invention relates to an architecture for a packet switch, and, more particularly, to a packet switch which dynamically allocates inputs between newly arriving packets and recirculating packets.

RELATED APPLICATION

A patent application Ser. No. 240,748 entitled "Broadband Packet Switch with Combined Queuing", filed for J. N. Giacopelli and M. Littlewood on even date herewith and assigned to the assignee hereof, contains subject matter related to the subject matter of the present application.

BACKGROUND OF THE INVENTION

An important element for providing advanced telecommunications services requiring large bandwidth is a high capacity packet switch capable of interconnecting a plurality of input ports and a plurality of output ports. A packet switch that can connect any specific input port to any specific output port is known as a full access packet switch.

Typically, such a packet switch is synchronous. The packets routed therein are of fixed length and are contained in time slots. During a packet switch cycle, packets present at the input ports are routed through an interconnection network comprising part of the packet switch to specific output ports. If the interconnection network is selfrouting, each packet arriving at an input port is provided with a header which contains the address of a specific output port to which the packet is to be routed. The interconnection network utilizes this address information to route the packets to the specific output ports.

A packet switch is internally non-blocking if it can deliver all packets from the input ports to the requested output ports when the packets are addressed to distinct output ports. However, there is still the possibility of external blocking, i.e. an internally non-blocking packet switch can still block if there are two simultaneous requests for the same output port. In this case, one or both packets to the same output port will be blocked. Accordingly, it is desirable for a packet switching architecture to be both internally and externally non-blocking.

One example of a minimally sized interconnection network is a banyan routing network. Even though a banyan network is sufficient for routing packets, routing decisions may cause internal collisions, even for a distinct set of addresses, reducing the throughput to an unacceptably low level. In short, the banyan network is an internally blocking network. The internal collisions in the banyan network can be eliminated by arranging packets in either ascending of descending order based on destination address before routing through the banyan network. The arrangement of packets in ascending or descending order can be accomplished through use of a Batcher sorting network connected in front of the banyan network. However, the resulting Batcher-banyan network is still externally blocking when two or more packets are simultaneously addressed to the same output.

Various packet switch architectures using Batcher and/or banyan networks have been proposed. These various architects utilize a variety of techniques to resolve output port conflicts among packets and use a variety of techniques to buffer or queue packets that are not routed as a result of a conflict resolution process. The techniques used impact the size and complexity as well as the overall performance and efficiency of the packet switch architecture.

The performance of an architecture is generally characterized by its packet loss rate and the delay for a given link utilization. Both delay and loss are dependent on congestion due to traffic profiles, the ability of the interconnection network to route to the appropriate destination and the amount of and placement of packet buffers.

Conceptually, zero packet loss can be achieved with an ideal switch design. The ideal switch design requires full interconnectivity from each input to every output and infinitely long queues at each output. Arriving packets can be moved immediately from the inputs to the outputs where they are queued for access to outgoing trunks. In reality, full interconnectivity is expensive and the number of buffers must be finite. All packet switch architecture make design trade offs between the complexity of the interconnection network and the number and location of packet buffers provided.

Alternative buffering locations are at the switch inputs [see e.g. "A Broadband Packet Switch for Integrated Transport," IEEE J-SAC Vol. SAC-5 No. 8, October 1987, J. Y. Hui and E. Arthurs; and "Reservation-Based Contention Resolution Mechanism for Batcher-Banyan Packet Switches," Electronics Letters Vol. 24 No. 13, June 23, 1988, B. Bingham and H. Bussey], at the switch outputs [see e.g. "The Knockout Switch: A Simple, Modular Architecture for High Performance Packet Switching, Proc. ISS '87, March 1987, Y. S. Yeh, M. G. Hluchyj and A. S. Acampora; and "A Broadband Packet Switch for Integrated Transport," IEEE J-SAC Vol. SAC-5 No. 8, October 1987, J. Y. Hui and E. Arthurs], and internally to the switch [see e.g. "Starlite: A Wideband Digital Switch," Proc. Globecom '84, November 1984, A. Huang and S. Knauer; "Applications of Self-Routing Switches to LATA Fiber Optic Networks," Poc. ISS '87, March 1987, C. Day, J. Giacopelli, and J. Hickey; and "Design of an Integrated Services Packet Network," IEEE JSAC, Vol. SAC-4, No. 8, November 1986, J. Turner]. The goal is to minimize packet loss and maximize utilization for a wide range of traffic conditions while minimizing the complexity of the switch architectures.

Input buffered switches service packets on a first-come first-served basis by storing new arrivals in input queues to await service. This arrangement suffers from head of the queue blocking. Head of the queue blocking occurs since a packet at the top of the queue which cannot be transmitted to a particular output, blocks other packets within the queue from exiting even though they may be addressed to idle outputs. A variety of relatively complex techniques such as queue depth search have been used to solve this problem.

Output queuing generally involves the use of multiple routing paths to each output. Thus, a number of packets addressed to an output may be simultaneously routed thereto depending on the number of routing paths to the output. The packets are then queued at the output ports to obtain access to outgoing trunks. Thus, output queuing is associated with the use of relatively complex interconnection networks necessary to achieve multiple routing paths to each output.

Internal queuing may be accomplished as follows. A trap network may be located in between a Batcher sorting network and a banyan routing network at the outputs of the Batcher network. The trap network identifies packets with repeated output port addresses. The repeats can then be discarded or recirculated back to the switch input ports for later transmission. Each recirculation loop typically includes an internal queue for use by recirculating packets. The use of recirculation loops and queues for recirculating packets solves the head of the queue blocking problem for packet switches. However, prior art packets switches utilizing internal queuing are provided with a dedicated input at the Batcher sorting network for each recirculation path. Thus, for an interconnection network of given size, this substantially reduces the number of input ports which can be used for servicing newly arriving packets. Another way of stating this is that a fixed bandwidth through the network is allocated to recirculating packets.

For example, in a typical switch, 33% of the Batcher ports, and thus, 33% of the available bandwidth, are allocated for recirculating rather than newly arriving packets. In such an arrangement, each input has 100% of its bandwidth dedicated to either recirculating or newly arriving packets. In practice, the offered load for which the switch is engineered will be much less than 100% so that the inputs dedicated to newly arriving packets will not be occupied at 100% capacity. Typically, the lines dedicated to newly arriving packets are occupied only 50% of the time so that 50% of their bandwidth will not be utilized.

It is an object of the present invention to take advantage of this excess bandwidth by dynamically allocating input ports between newly arriving and recirculating packets. Such a dynamic allocation results in more efficient use of available bandwidth.

SUMMARY OF THE INVENTION

The present invention is a packet switch which dynamically allocates input lines between newly arriving and recirculating packets to make more efficient use of available bandwidth.

The switch includes a plurality of input port controllers, a plurality of output port controllers and a network for resolving output port conflicts among packets. In a switch cycle, the conflict resolution network identifies packets which are to be routed to the output port controllers. The conflict resolution network also identifies packets which can not be routed to the output port controllers and which are to be recirculated back to the input port controllers.

The packets to be routed to the output port controllers are routed via one or more routing networks which illustratively are banyan networks. The packets to be recirculated are returned to the input port controllers as follows. An input port controller which will not be transmitting a newly arriving packet into the switch in a subsequent packet time slot issues a steering packet which includes its (i.e. the issuing input port controller's) address. The steering packet is combined with a recirculating packet so that the issuing input port controller's address forms a header for the recirculating packet. The recirculating packet is then routed back to the issuing input port controller via a routing network in the recirculation path for resubmission in the subsequent packet time slot when the input port controller will not be submitting a newly arriving packet into the switch.

In this manner the switch inputs are dynamically allocated between newly arriving and recirculating packets. Input port controllers only receive recirculating packets when they do not have newly arriving packets to submit to the switch.

BRIEF DESCRIPTION OF THE DRAWING

FIGS. 9, 10 and 11 illustrate the format of packets utilized in the switch of FIG. 8.

DETAILED DESCRIPTION OF THE INVENTION

A. Packet Switch Architecture

Figure 1:
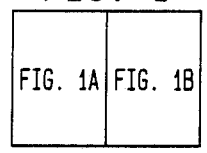
FIGS. 1A and 1B (arranged as shown in FIG. 1 and jointly referred to herein as FIG. 1) schematically illustrate a packet switch architecture utilizing internal and output queuing.
Figure 1A:
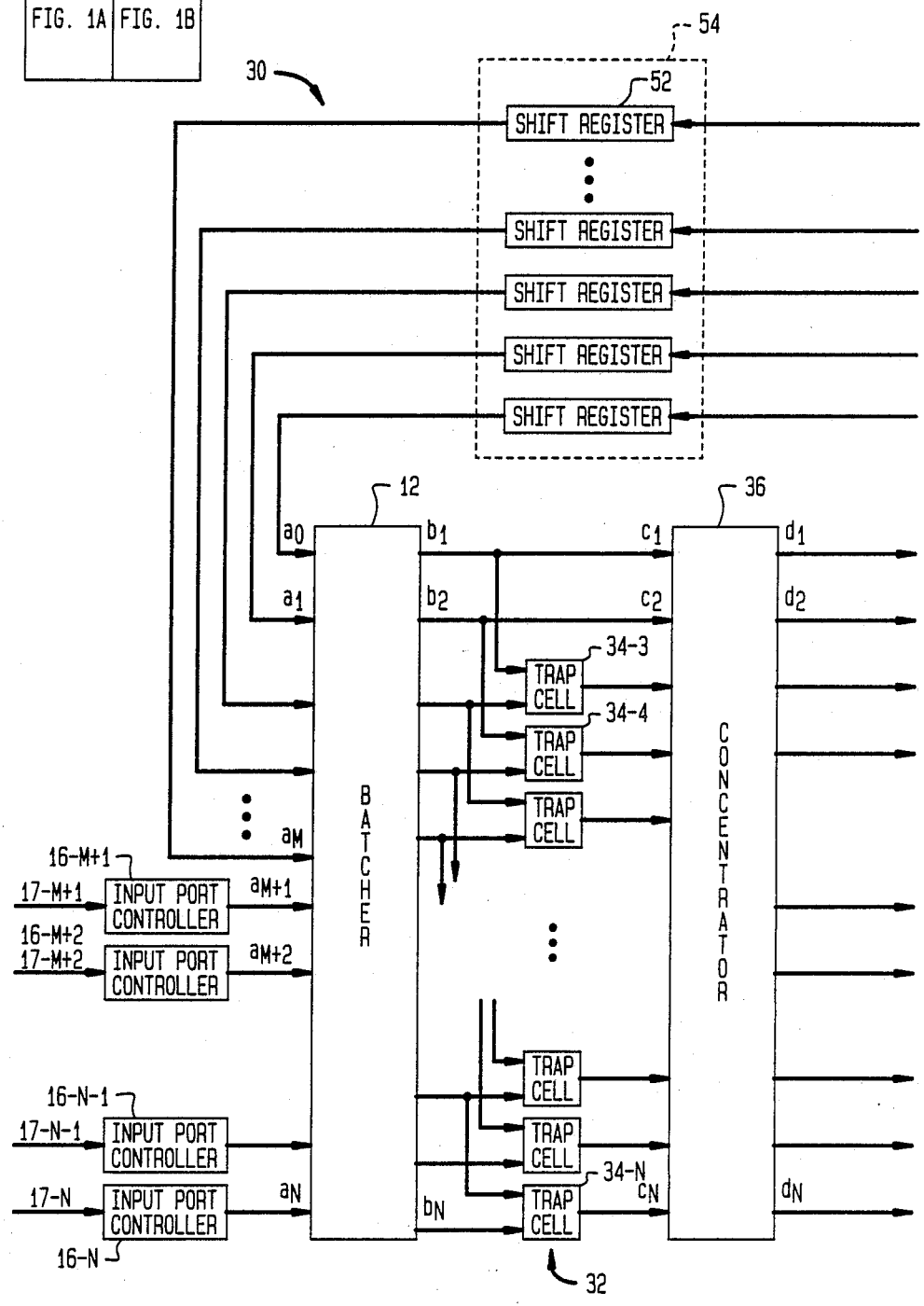
Figure 1B:
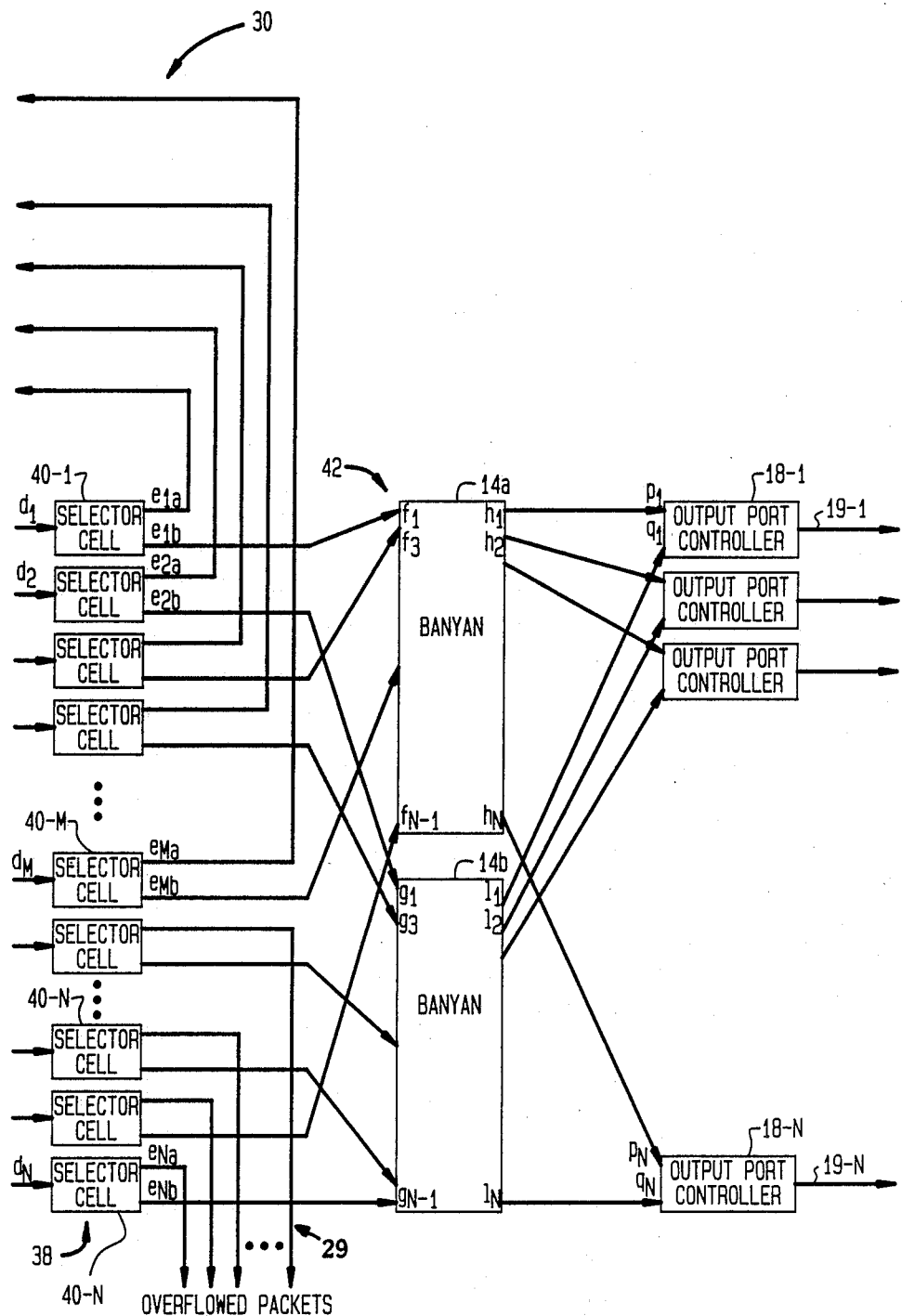

FIG. 1 shows a packet switch architecture 10 that is built around an $N \times N$ Batcher sorting network 12 and a plurality of banyan routing networks 14a, 14b. The Batcher network 12 has N input lines designated $a_1, a_2 \ldots a_M, a_{M+1} \ldots a_N$ and N output lines designated $b_1, b_2 \ldots b_N$. The packet switch 10 also comprises of input port controllers 16-M+1, 16-M+2 . . . , 16-N-1, 16-N and a plurality of output port controllers 18-1 . . . 18-N. The input port controllers are connected to incoming trunks 17-M+1, 17-M+2, . . . 17-N and the outgoing port controllers are connected to outgoing trunks 19-1 . . . 19-N.

In FIG. 1, the Batcher network inputs are divided into two groups. A first group of inputs $a_1 \ldots a_M$ receives recirculating packets from the recirculation loops 30. A second group of inputs $a_{M+1}, a_{M+2} \ldots a_N$ receives newly arriving packets via the trunks 17-M+1 . . . 17-N and input port controllers 16-M+1 . . . 16-N. It should be noted that in the network 10 of FIG. 1, the number of Batcher inputs allocated to receiving newly arriving packets is fixed and the number of Batcher inputs allocated to receiving recirculating packets is fixed. Another way of stating this is that a fixed fraction of the total bandwidth through the switch 10 is allocated to recirculating packets.

In any packet switching cycle, the packets present at the Batcher inputs are synchronously transmitted through the Batcher network and sorted, for example, in ascending order according to a destination address found in the packet header. Thus, during any packet switching cycle, the packets are sorted according to destination addresses at the Batcher outputs $b_1, b_2 \ldots b_N$. Since the packet switch 10 of FIG. 1 is a synchronous switch, the packets may be viewed as occupying timeslots. The input signal at any Batcher input may be viewed as comprising a sequence of packets that are synchronous with the packets at any other input.

Illustratively, data in Asychronous Time Division Multiplexed format (see e.g. "Asynchronous Time-Division Techniques: An Experimental Packet Network Integrating Video Communications," ISS '84, May 1984, A. Thomas, J. P. Coudreuse, and M. Servel) or Dynamic Time Division Multiplexed format (see e.g. "Dynamic TDM—A Packet Approach to Broadband Networking," Proc. ICC '87, June 1987, L. T. Wu, S. H. Lee and T. T. Lee) arrives via the trunks 17. The input port controllers 16 insert headers obtained from translation tables in front of each transmission packet found in the Asynchronous Time Division Multiplexed data or Dynamic Time Division Multiplexed data. It should be noted that recirculating packets have previously been provided with headers by the input port controllers when they were newly arriving packets.

Figure 2:
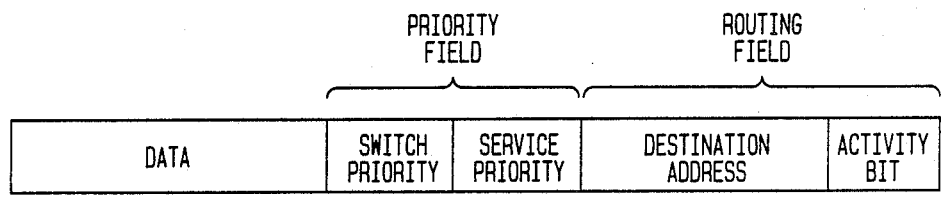
FIG. 2 shows the format of packets routed through the switch of FIG. 1.

The format of each resulting packet is shown in FIG. 2. Each packet comprises a data field which contains user data and a header. The header comprises a routing field and a priority field. Both fields are ordered with their most significant bit first. The first bit of the routing field serves as an activity bit (A) where a logical "1" represents an active packet and a logical "0" represents an idle packet. Idle packets appear to have lower addresses than active packets. This causes idle packets to be grouped together at the lower numbered outputs of the Batcher sorting network 12. The remainder of the bits in the routing field comprise the destination address. For packets addressed to the same destination, the Batcher network 12 will continue to sort over the priority field. The priority field contains two sub-fields. The service priority (SP) sub-field identifies a class of service to which the packet belongs. The switch priority (PR) sub-field maintains a count of the number of slots has been delayed (through the use of the recirculation loop 30) with an initial value of all logical "1"s. Illustratively, for every slot a packet is delayed, the PR-subfield is decremented to increase the packet's priority relative to other packets within the same service class. Thus, the Batcher sorting network 12 of FIG. 1, produces at its outputs $b_1 \ldots b_N$ a sorted list of packets ordered by destination address. Within each common destination, packets are ordered by priority of service.

In the packet switch 10 of FIG. 1, two banyan networks 14a, 14b are utilized. This means there are two routing paths directed to each output port controller 18 and two packets can simultaneously be routed to each output port controller 18. The arriving packets are queued at the output port controllers 18 to await access to the outgoing trunks 19.

If there are more than two packets present at the Batcher outputs, $b_1 \ldots b_N$ contending for the same output port controller, a conflict resolution process is utilized to determine which packets will be permitted to exit to the output port controllers. Those packets not "winning" the conflict resolution process are recirculated via the recirculation loops 30 back to the Batcher inputs for re-transmission in next packet switch cycle.

In the packet switch of FIG. 1, contention is resolved by identifying the two top packets within a common address block, since these will be the highest priority packets of the group. All other packets in a common address block are recirculated. The trap network 32 operates on the sorted output produced by the Batcher network 12 wherein packets with common destination addresses appear on adjacent outputs.

Figure 3:
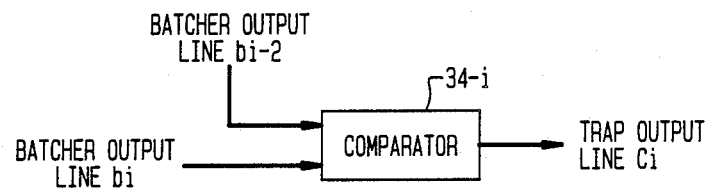
FIG. 3 shows a comparator or trap cell forming part of the packet switch of FIG. 1.

The trap network 32 comprises a column of trap cells, 34-3, 34-4 ... 34-N, one for each output $b_3 \ldots b_N$ of the Batcher network. The trap cells are address comparators. The trap network outputs are designated $c_1, c_2 \ldots c_N$. As shown in FIG. 3, the comparator (i.e. trap cell) 34-i compares the destination address on Batcher output line $b_i$ with the destination address on Batcher output line $b_{i-2}$. If the addresses are equal, then the packet on line $b_i$ losses the conflict resolution process and is recirculated. If the addresses are different, then the packet on line $b_i$ wins the contention resolution since it is either the highest or second highest priority packet to a particular destination. The packet present on Batcher output line $b_i$ emerges from the trap network comparator 34-i on the trap network output line $c_i$. A trap bit in the packet is set if the compared destination addresses are equal and the packet is to be recirculated. The trap bit is not set if the compared destination addresses are not equal and the packet is to exit to an output port controller via a banyan network 14. Note that the top two Batcher output lines $b_1, b_2$ are not associated with comparators as these two lines contain two packets addressed to two different output port controllers or the two highest priority packets addressed to the same output port controller. In either event these packets can be routed by one or both of the banyan networks 14. However, delay elements (not shown) are utilized on the lines $b_1, b_2$ so that packets on the lines $b_1, b_2$ remain synchronous with packets on the lines $b_3 \ldots b_N$.

For a network with k banyan routing networks 14, k packets may be routed to a particular output port controller 16 in a packet switching cycle. In this case, the trap network compares the packet on Batcher output line $b_i$ with the packet on Batcher output line $b_{i-k}$. If the addresses are equal, the packet on line $b_i$ is recirculated. Otherwise the packet on line i exits to the appropriate output port controller.

After the trapping network identifies packets to be routed to the output port controllers and packets to be recirculated, the two groups of packets should be separated so that the packets to be recirculated can be steered to the recirculation loops 30 and the packets exiting to the output port controllers can be steered to the banyan networks 14. In addition, to meet the non-blocking criterion for banyan networks, the exiting packets must be repacked into an ascending list by destination address without any gaps between them.

A concentrator network 36 performs this task by regrouping the packets into two separate lists. The packets to be recirculated are put in one list and the exiting packets are placed in the other list. A routing header constructed by the concentrator network 36 steers packets to be recirculated to one edge of the concentrator network (i.e. to the lower numbered outputs) and the exiting packets to the opposite edge (i.e. to the higher numbered outputs). Lists are built starting at opposite edges with each list growing towards the center of the concentrator outputs $d_1 \ldots d_N$. This procedure results in two separate sorted lists of packets.

The boundary between packets to be recirculated and exiting packets at the outputs of the concentrator 36 is arbitrary. Therefore each concentrator output desirably has access to both the recirculation loops 30 and one of the banyan networks 14a, 14b. Such access is provided by the selector network 38 which comprises a column of cells 40-1, 40-2 ... 40-N, each having an input $d_1, d_2 ... d_N$ and two outputs $e_{1a}, e_{1b} ... e_{Na}, e_{Nb}$. The outputs $e_{1a}, e_{2a} ... e_{Ma}$ form part of the recirculation loops 30. The outputs $e_{(M+1)a}, e_{(M+2)a} ... e_{Na}$ handle overflow packets which are lost via the lines 29. Thus any packets to be recirculated and appearing on this latter set of outputs are lost as overflow packets. Another way of looking at this is to note that the recirculation bandwidth is finite. If, in any switch cycle, the number of packets to be recirculated exceeds the recirculation bandwidth, packets are lost. Note that each of the recirculating loop 30 includes a shift register 52 for queuing recirculating packets. The shift registers together form the shared queue 54. The queue 54 is designated a shared queue because a packet from any Batcher input can be queued therein. Recirculating packets, stored in the queue 54, enter the Batcher network via the inputs $a_1 ... a_M$.

The packets present at the selector outputs $e_{1b}, e_{2b} ... e_{Nb}$ are transmitted to the banyan networks 14a, 14b for routing to particular output port controllers. When there are two packets addressed to the same output port controller present at the outputs $e_{1b}, e_{2b} ... e_{Nb}$, the two packets are routed using separate banyan networks. To accomplish this, an inverse perfect shuffle wiring pattern 42 connects the outputs $e_{1b}, e_{2b} ... e_{Nb}$ to the banyan networks. This wiring pattern divides the sorted list of packets present at the outputs $e_{1b}, e_{2b} ... e_{Nb}$ into two separate but sorted lists having a unique set of destination addresses. In accordance with the inverse perfect shuffle wiring pattern, outputs $e_{1b}, e_{3b}, e_{5b} ... e_{(N-1)b}$ are connected to the inputs $f_1, f_3, f_5, ... f_{N-1}$ of the banyan 14a and the outputs $e_{2b}, e_{4b} ... e_{Nb}$ are connected to the inputs $g_1, g_3 ... g_{N-1}$ of the banyan network 14b. The inputs $f_2, f_4 ... f_N$ of the banyan 14a are set to zero and the inputs $g_2, g_4, ... g_N$ of the banyan 14b are set to zero.

The outputs $h_1, h_2 ... h_N$ of the banyan network 14a are connected to the inputs $P_1, P_2 ... P_N$ of the output port controllers 16 and the outputs $l_1, l_2 ... l_N$ of the banyan network 14b are connected to the inputs $q_1, q_2 ... q_N$ of the output port controllers 18.

Figure 4:
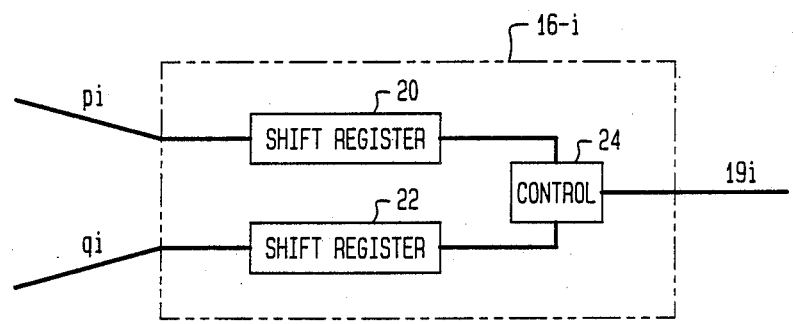
FIG. 4 shows an output port controller forming part of the packet switch of FIG. 1.

Illustratively, as shown in FIG. 4, each output port controller 18-i includes a shift register 20 associated with the input $p_i$ and a shift register 22 associated with the input $f_i$. The shift registers 20, 22 serve as queues for packets arriving via the inputs $p_i, q_i$. The control device 24, enables the queues 20, 22 to access the outgoing trunk line 19-i. Note, in an alternative embodiment of the invention, there may be separate queues in the output port controllers for packets from different classes of services. Instead of shift registers, RAM devices may be used to queue packets at the outport controllers.

In FIG. 1, the network 12 is shown as a full Batcher network. However, if there are N/2 input port controllers and N/2 recirculation lines, an N×N Batcher network is not necessary. Since packets are already sorted at the trap network, a concentrator can maintain the relative positions of the trapped packets producing a sorted list of trapped packets. For this case an (N/2)×N/2 Batcher network is needed to sort the new arrivals. At this point, both the trapped packets and new arrivals are separate but sorted lists that are then merged together. This is accomplished using a merge network which is actually the last stage of an N×N Batcher network to produce a sorted list of length N.

B. Prioritized Overflow

One problem with the packet switch architecture of FIG. 1, is that packets will be lost, when in any switching cycle, there are more packets to be circulated than there are recirculation loops. The sorting and trapping networks 12, 32 sort packets based on their destination addresses. This same order is maintained by the selector network 38. When overflow occurs, the highest addressed packets, regardless of the priority level, are lost first resulting in a network that favors low addresses.

Figure 5:
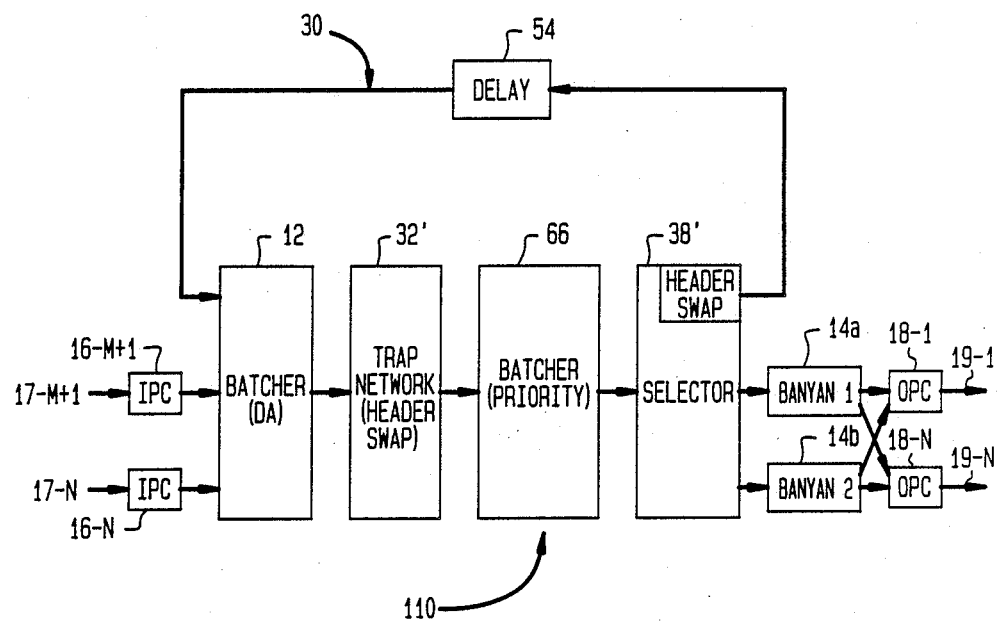
FIG. 5 schematically illustrates the architecture of a packet switch with prioritized overflow.

To correct this problem, packets are preferably given access to the recirculation loops based on priority, not designation address, so that the lowest priority packets are the first to be lost at overload. To accomplish this, the packets are reordered before the recirculation. A packet switch 110 for carrying out such reordering is shown in FIG. 5. In FIG. 5, the Batcher network 66 replaces the concentrator network 36. In addition, the functions performed by the trap and selector networks 32 and 38 of FIG. 1 are modified in the networks 32' and 38' of FIG. 5. A concentrator network is limited to partitioning a list of packets into two parts. The concentrator network 36 of FIG. 1 partitions packets arriving at its inputs into lists of trapped (i.e. non-exiting packets including recirculating and overflow packets) and exiting packets. To partition trapped packets based on priority, multiple concentrator networks would be required. Such an approach would be both complex and expensive. Instead, the needed partitioning is carried out using the Batcher network 66.

A Batcher network can be used to partition a list into as many pieces as necessary by constructing a two part header whose first part groups common packets and a second part that orders packets within the groups.

The routing and priority fields of the packets (see FIG. 2) contain the necessary information to accomplish the desired partitioning. Thus, packets are compared in the trap network 32' of FIG. 5 in the same manner as they are compared in the trap network 32 of FIG. 1. However, in contrast to the network 32 of FIG. 1, trapped packets leaving the network 32' of FIG. 5 will have their routing and priority fields interchanged thus marking them for recirculation. The first bit of the priority field is now defined as a logical zero. Since an active packet's activity bit (see FIG. 2) is a logical one, trapped packets will have lower addresses than exiting packets because of the leading zero. Idle packets are constructed by the input port controllers 17-M+1 ... 17-N to have an address between the valid ranges for trapped and exiting packets. In this case, when the packets leaving the trap network 32' are sorted using the Batcher sorting network 66, the packets at the outputs of the sorting network are arranged so that the trapped packets appear the outputs with the lowest addresses, followed by the idle packets, followed by the exiting packets. The trapped packets are ordered from the highest priority to lowest priority and the exiting packets are ordered according to destination address. Thus, the trapped packets with lowest priority are most likely to be lost as overflow packets.

The selector cells comprising the selector network 38' now make a decision based on the first bit of each arriving packet. All packets with leading zeros are directed towards the recirculation loops and all packets with leading ones are directed toward the banyan networks 14a, 14b. At the point where packets overflow (i.e. at the point where there are more packets with leading zeros than recirculating loops), the overflow packets will also be directed to the banyan networks (rather than to the distinct overflow lines 29 of FIG. 1). These packets, with leading zeros, will not effect the routing capabilities of the banyan networks. However, these overflow packets can be monitored by the output port controllers to obtain some idea of the fraction of packets being lost. In the event corresponding input port and output port controllers form duplex controllers, these overflow packets can be queued and resubmitted to the switch in a later switch cycle.

Before trapped packets enter the recirculation loops 30, the priority and routing fields are swapped again, placing the routing field in front. This header swap is carried out by the selector cells in the selector network 28' and insures that packets reentering the switch via the inputs $a_1 \ldots a_n$ of the Batcher network 12 have the appropriate header format. In addition, the priority field of each recirculating packet will be decremented to increase its priority relative to packets which have not been recirculated or have been recirculated fewer times.

C. Dynamic Allocation of Batcher Inputs

In the packet switch architecture of FIG. 1, a fixed fraction of the packet switch bandwidth is dedicated to recirculating packets. This fraction may be represented as M/N which M is the number of Batcher inputs dedicated to recirculating packets and N is the total number of Batcher input lines. The remainder of the inputs are dedicated to newly arriving packets. Illustratively, M/N is about a third so that 33% of available bandwidth is dedicated for recirculating packets.

It should be noted, however, that the capacity of each Batcher input $a_1 \ldots a_N$ is allocated 100% to recirculating or newly arriving packets. However, in reality the offered load on each input line dedicated to newly arriving packets is much less than 100%. For example, the offered load on an input line allocated to newly arriving packets may be 50% so that the input line is idle half the time. To take advantage of this excess capacity, Batcher inputs $a_1 \ldots a_M$ may be dynamically allocated between newly arriving and recirculating packets. When this is done, it is not necessary to dedicate a fixed fraction of the switch bandwidth to recirculating packets.

Figure 6:
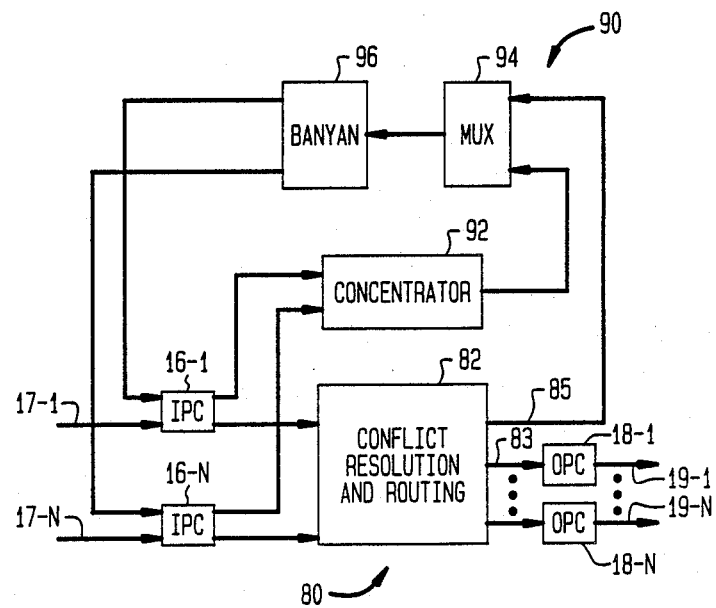
FIG. 6 schematically illustrates a packet switch architecture in which inputs are dynamically allocated between newly arriving and recirculating packets, in accordance with an illustrative embodiment of the present invention.

In accordance with an illustrative embodiment of the present invention, a packet switch with dynamic input allocation is shown in FIG. 6. The packet switch 80 of FIG. 6 comprises a plurality of input port controllers 16-1 ... 16-N which receive newly arriving packets via the incoming trunks 17-1 ... 17-N. The packet switch 80 also includes a plurality of outport port controllers 18-1 ... 18-N which interface with outgoing trunks 19-1 ... 19-N. A conflict resolution and routing network 82 is provided. This network serves to resolve conflicts between packets addressed to the same output port and to route exiting packets to the output port controllers 18-1 ... 18-N. Packets which cannot be routed to the output port controllers are sent via lines 85 to the recirculation network 90 for return to the input port controllers. Illustratively, the network 82 comprises a Batcher sorting network, a trap network for identifying exiting and recirculating packets, a concentrator network for separating the exiting and recirculating packets into separate lists, and a selector network for transmitting recirculating packets to the recirculation network 90 and for transmitting exiting packets to one or more banyan routing networks for routing to the output port controllers. Such a conflict-resolution and routing arrangement is illustrated in FIG. 1 and comprises elements 12, 32, 36, 38 14a, 14b of FIG. 1. The recirculation network 90 comprises concentrator 92, multiplexer 94, and banyan network 96.

The packet switch 80 of FIG. 6 operates as follows. All newly arriving packets at each input port controller are delayed for a period in excess of one packet slot. This provides time for an input port controller to decide in time slot T if it will be idle during the time slot T+2. If an input port controller will be idle during time slot T+2, then it serves as an access point for a recirculating packet. In such a case, the input port controller submits an active steering packet to the concentrator 92 that will be paired with a recirculating packet to provide a routing header that returns the recirculating packet to the input port controller that issued the steering packet. The input port controller that receives the recirculating packet, will then resubmit the recirculating packet to the network 82 in the T+2 time slot.

Figure 7:
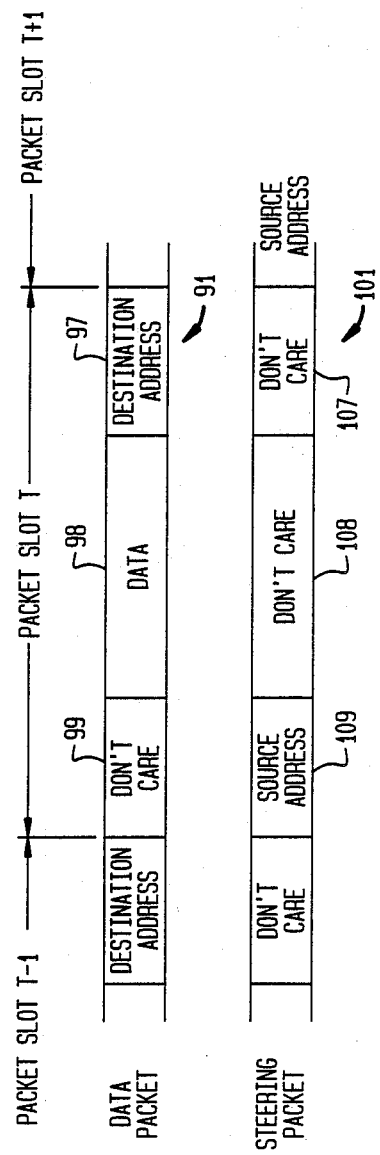
FIG. 7 shows the format of packets utilized in the packet switch of FIG. 6.

The packet formats for both the data packet and the steering packets are shown in FIG. 7. The data packet 91 in packet time slot T contains a destination address field (DA) 97, a data field 98, and an additional field 99 following the data field. When a data packet is submitted by an input port controller into the switch, the additional field 99 is in the dont't care state as designated by the symbol "X". As shown in FIG. 7, the steering packet 101 is the same size as the data packet 91. However in the steering packet 101, the fields 107 and 108 (corresponding to the fields 97 and 98) are in the don't care state and the field 109 (corresponding to the field 99) contains the address of the input port controller which generated it.

The network 80 dynamically allocates inputs between newly arriving packets and recirculating packets as follows. As indicated above, an input port controller that will be idle during packet slot T+2 generates an active steering packet during the packet time slot T that includes its address in the source address field 109. An input port controller that will not be idle during the packet time slot T+2 generates an idle steering packet during the packet slot T as indicated by an activity bit being set to zero. The active and idle steering packets are concentrated by the concentrator network 92. Since the input port controllers 16-1 ... 16-N are connected in order of address to the concentrator 92, the resulting concentrated list meets the non-blocking criteria of the banyan network 96. The steering packets generated during packet slot T are timed so that they meet up synchronously with the don't care fields 99 of recirculating packets of packet slot T. The multiplexer 94 gates the source field 109 of each steering packet with the field 99 of a corresponding recirculating data packet of slot T. The source address which is now located in the field 99 of a recirculating packet of slot T serves as a header to route a recirculating data packet of slot T+1 (i.e. the immediately following recirculating packet) back to the input port controller indicated by the source address. The input port controller then resubmits the data packets to the switch during the slot T+2 when it would otherwise be idle.

The packet switch architecture 80 of FIG. 2, dynamically allocates recirculating lines by sharing access with underutilized input lines. The amount of bandwidth available for recirculating packets will fluctuate on a slot-by-slot basis. It should be noted that even if there are more recirculating packets than idle port controllers for a particular slot, these excess recirculating packets will pair up with idle steering packets and emerge from the banyan network 96 at random locations. These packets may then be queued at the input port controllers for possible later re-submission to the switch.

D. Trunk Grouping

Trunk grouping allows increased bandwidth to be engineered on a per route basis (see e.g. "Multichannel Bandwidth Allocation", U.S. Patent Application Serial No. 07/175,239 filed for Achille Pattavina on Mar. 30, 1988 and assigned to the assignee hereof). Trunk grouping pools switch resources by assigning multiple outgoing trunks to a common group. This group is then treated as a single high bandwidth trunk. A common address (logical address) represents each trunk group but each individual trunk in a group requires a routing address (physical address) that uniquely identifies it.

Figure 8:
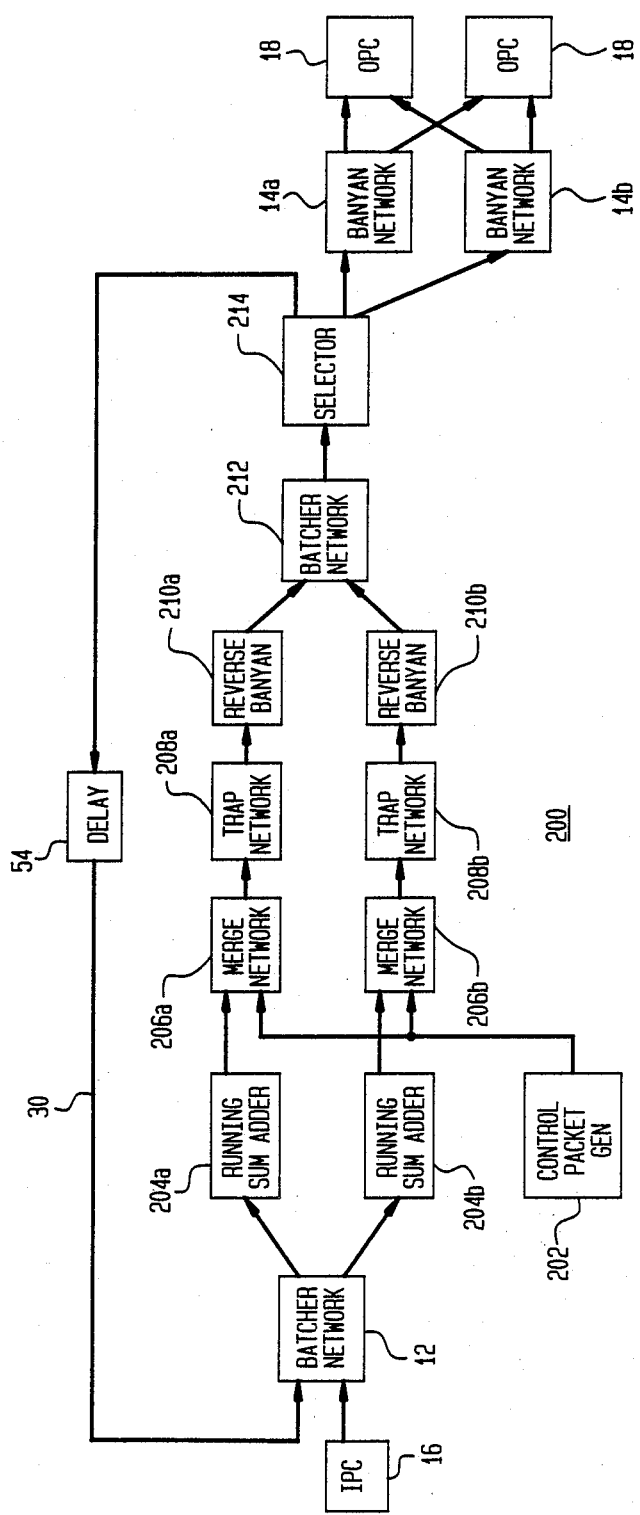
FIG. 8 schematically illustrates the architecture of a packet switch utilizing trunk grouping.

A packet switch 200 utilizing recirculation, multiple routing paths to each output and trunk groups is illustrated in FIG. 8. In the packet switch 200 of FIG. 8, contention is resolved using logical addresses while routing is performed using physical addresses. Translation from logical addresses to physical addresses is carried out using control packets. The control packets are generated using the control packet generator 202 which stores the necessary translation information.

The initial packet headers are shown in FIG. 9. Each newly arriving data packet is formed by the input port controllers and contains an activity bit (A), a logical address field (LA), a logical address index field (LA INDEX), a fixed logic "1", a packet index field (PKT INDEX), a trap flag (T), a priority field (PR) and a data field. The symbol X indicates a "don't care" state. Initially for each data packet, the input port controllers set the LA INDEX, PKT INDEX and T flag to logic "0". The activity bit is set to logic 1 for active packets and zero for idle packets. The LA field contains the logical address for the packet. Packets entering the Batcher network 12 from the recirculation loops 30 have the same format as the data packet of FIG. 9.

The format of the control packets generated by the control packet generator 202 is also shown in FIG. 9. Each control packet contains an activity bit (A), logical address field (LA), logical address index field (LA INDEX), a fixed logic "0", a trap flag (T), and physical address field (PA).

During a switch cycle, the N×N Batcher network 12 produces a sorted list based on the logical addresses and, within each common logical address, packets are ordered by priority. The outputs of the N×N Batcher network 12 are connected to two running sum adder networks 204a, 204b. Each of the networks 204a, 204b is an (N/2)×(N/2) network. The outputs of the Batcher network 12 are connected to the running sum adder networks using the inverse perfect shuffle wiring pattern discussed in connection with FIG. 1. The adder networks 204a, 204b performs two operations. First they compute a running count of the number of packets having a particular logical address and store this value within each LA INDEX field. Secondly, they compute a running count over all data packets. This value is stored in the PKT index field of each packet. The combination of fields A, LA, LA INDEX and fixed logic "1" uniquely selects a control packet to be assigned to a particular data packet. The fixed logic "1" field serves as the least significant bit of the header of a data packet, thus making all data packets appear to have an odd address. The fixed logic "0" field of the control packet makes all control packets appear to have an even address.

The control packets are merged with the data packets using the merge networks 206a, 206b. At the outputs of the merge networks is a combined sorted list comprising data and control packets. The sorting is based on logical addresses. The trap networks 208a, 208b pair control packets to data packets if there is a control packet on line i that matches the A, LA, LA INDEX fields of the data packet on line i+1. For paired packets, the physical address (PA) field is copied from the control packet into the data packet with the priority field (PR) being shifted back one position. Data packets which do not pair up with control packets are not altered. After completing the process, the trap networks 208a, 208b rotate the A, LA, and LA INDEX fields to the back of the header. The headers at the outputs of the trap network 208a, 208b are shown in FIG. 10. More particularly, FIG. 10 shows the header of a non-paired or trapped data packet and the header of a paired packet as well as the header of a control packet. For paired packets, the trap flag is set at logic "1". For unpaired packets, the trap flag is set at logic "0".

The non-paired packets are eventually recirculated back to the inputs of the Batcher network 12 using the recirculation loops 30. Illustratively, a packet is not paired in the following circumstances. In a packet switch cycle, the number of control packets produced for each logical address is equal to the number of physical addresses corresponding to the particular logical address multiplied by the number of routing paths to each physical address. If, in a particular switch cycle, the number of data packets having a particular logical address exceeds the number of control packets for a particular logical address (and therefore exceeds the routing capacity of the switch to the logical address), the packets will not be paired and will be recirculated.

Figure 11:
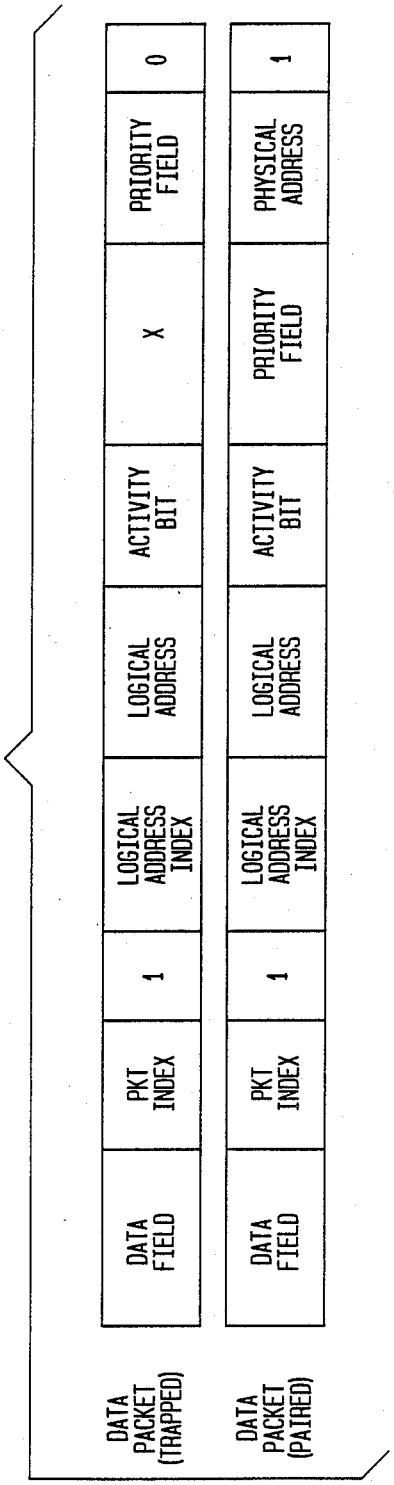

The reverse banyan networks 210a, 210b separate control packets from data packets. A reverse banyan network is a mirror image of a banyan network except it routes based on least significant bit first. It is non-blocking for a continuous set of ascending or descending addresses though idle packets may be interleaved with active packets. The reverse banyan networks 210a, 210b direct all data packets to the second Batcher network 212 using the fixed logical 1 and PKT index field as a routing header. During the routing process, the fixed logical 1 and PKT INDEX fields are rotated to the back of the header producing the format for trapped packets (i.e. packets to be recirculated) and paired packets shown in FIG. 11. The Batcher 212 concentrates the list of data packets based on priority or physical address. The selector network 214 separates the paired and unpaired packets. The paired packets are routed through the banyan networks 14a; 14b to the output port controllers 18 based on physical address. The unpaired packets are modified by the selector network 212 so that they have the format of newly packets. These packets are then routed via the recirculation loops 30 back to the Batcher 12.

CONCLUSION

A packet switch architecture which dynamically allocates inputs between newly arriving and recirculating packets has been disclosed. Finally, the above described embodiments of the invention are intended to be illustrative only. Numerous alternative embodiments may be devised by those skilled in the art without departing from the spirit and scope of the following claims.

What is claimed is:

1. A recirculation arrangement for use in a packet switch having a plurality of inputs and a plurality of outputs, said recirculation arrangement serving to route data packets which cannot be routed to said outputs back to said inputs, said recirculation arrangement comprising
means for generating steering packets containing input addresses,
means for combining said steering packets and said data packets to be routed back to said inputs so that said addresses in said steering packets form headers for said data packets to be routed back to said inputs, and
a self-routing network for routing said data packets to said inputs based on said headers.

2. The arrangement of claim 1 wherein said routing network is a banyan network and said recirculation arrangement further includes a concentrator network for concentrating said steering packets before they are combined with said data packets.

3. A packet switch comprising
a plurality of input port controllers for receiving newly arriving and recirculating data packets synchronously in time slots,
a plurality of output port controllers,
conflict resolving means for resolving conflicts among data packets containing the same destination address so as to indicate which packets are to be routed to said output port controllers so that they can exit from said switch and to indicate which packets are to be recirculated to said input port controllers,
routing means for routing packets indicated as exiting by said conflict resolution means to said output port controllers, and
recirculating means for recirculating packets indicated as recirculating by said conflict resolution means back to said input port controllers,
said recirculating means serving to allocate said input port controllers between said newly arriving packets and said recirculating packets on a slot-by-slot basis.

4. The switch of claim 3 wherein said conflict resolution means comprises a trap network.

5. The switch of claim 3 wherein said routing means comprises a banyan network.

6. The switch of claim 3 wherein said routing means comprises a plurality of routing networks to provide multiple paths to each output port controller.

7. The switch of claim 3 wherein said recirculating means comprises means for combining said recirculating packets with steering packets to provide said recirculating packets with headers containing the addresses of input port controllers and routing means for routing said recirculating packets to the input port controllers indicated by the headers.

8. A packet switch for synchronously routing data packets in time slots between a plurality of inputs and a plurality of outputs, said switch comprising:
means for resolving conflicts among data packets occupying the same time slot and containing the same output address to indicate which of said packets is to be recirculated to said inputs and which of said packets is to be routed to said outputs, and
recirculating means for allocating said inputs on a slot-by-slot basis between newly arriving data packets and recirculating packets to enable said recirculating packets to be routed back to said inputs.

9. The switch of claim 8 wherein said address is a logical address or a physical address.

10. A method for synchronously routing data packets in time slots between a plurality of inputs and a plurality of outputs of a packet switch comprising the steps of:
resolving conflicts among data packets occupying the same time slot and containing the same output address to indicate which of said packets is to be recirculated to said inputs and which of said packets is to be routed to said outputs, and
allocating said inputs on a slot-by-slot basis between newly arriving data packets and recirculating data packets to enable said recirculating packets to be routed back to said inputs.

11. The method of claim 10 wherein said method further comprises the step of delaying each newly arriving data packet at an input for a duration in excess of one time slot.

12. A method for routing packets in a packet switch comprising the steps of:
determining whether each of a plurality of inputs of said switch will submit a newly arriving data packet to said switch in a particular subsequent time slot,
generating a steering packet at each input that will not submit a newly arriving data packet to said switch in said subsequent time slot, said steering packets containing the addresses of the inputs issuing them,
combining said steering packets with recirculating data packets to provide said recirculating packets with the addresses of inputs that will not submit a newly arriving packet in said subsequent time slot, and
routing said recirculating packets to the inputs indicated by said addresses so that said recirculating packets can be resubmitted to said switch in said subsequent time slot.

* * * * *

UNITED STATES PATENT AND TRADEMARK OFFICE
CERTIFICATE OF CORRECTION

PATENT NO. : 4,866,701

DATED : September 12, 1989

INVENTOR(S) : James N. Giacopelli
Walter D. Sincoskie

It is certified that error appears in the above-identified patent and that said Letters Patent is hereby corrected as shown below:

Column 1, line 58, "of" should read --or--.
Column 2, line 46, "JSAC" should read --J-SAC--.
Column 4, line 43, "comprises of" should read --comprises a plurality of--.
Column 5, line 41, "slots has" should read --slots a packet has--.
Column 8, line 14, "designation" should read --destination--.
Column 10, line 26, "dont't" should read --don't--.
Column 12, line 58, "newly packets" should read --newly arriving packets--.

Signed and Sealed this

Sixteenth Day of June, 1992

*Attest:*

DOUGLAS B. COMER

*Attesting Officer*     *Acting Commissioner of Patents and Trademarks*